United States Patent
Howarth et al.

(10) Patent No.: US 11,459,893 B2
(45) Date of Patent: Oct. 4, 2022

(54) EFFICIENT GAS TURBINE ENGINE INSTALLATION AND OPERATION

(71) Applicant: ROLLS-ROYCE PLC, London (GB)

(72) Inventors: Nicholas Howarth, Derby (GB); Gareth M Armstrong, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 23 days.

(21) Appl. No.: 17/212,554

(22) Filed: Mar. 25, 2021

(65) Prior Publication Data

US 2021/0207483 A1 Jul. 8, 2021

Related U.S. Application Data

(63) Continuation of application No. 16/713,666, filed on Dec. 13, 2019, now Pat. No. 10,982,550, which is a
(Continued)

(30) Foreign Application Priority Data

Mar. 11, 2019 (GB) ..................................... 1903262

(51) Int. Cl.
*F01D 5/14* (2006.01)
*F02C 7/04* (2006.01)
(Continued)

(52) U.S. Cl.
CPC .............. *F01D 5/145* (2013.01); *F01D 5/141* (2013.01); *F01D 5/28* (2013.01); *F02C 3/02* (2013.01);
(Continued)

(58) Field of Classification Search
CPC .... F02C 7/04; F02C 7/042; F02K 3/04; F02K 3/06; F02K 3/068; F04D 19/024; F04D 29/681
See application file for complete search history.

(56) References Cited

U.S. PATENT DOCUMENTS 9,376,917 B2 6/2016 Murooka et al.
10,260,351 B2 4/2019 Parkin et al.
(Continued)

FOREIGN PATENT DOCUMENTS

EP 2 520 763 A2 11/2012
EP 3 444 468 A1 2/2019
FR 3 043 714 A1 5/2017

OTHER PUBLICATIONS

Wendus, Bruce E., et al. "Follow-On Technology Requirement Study for Advanced Subsonic Transport", NASA/CR-2003-212467 (2003—year of publication sufficiently early that month is not at issue).
(Continued)

*Primary Examiner* — Scott J Walthour
(74) *Attorney, Agent, or Firm* — Oliff PLC

(57) ABSTRACT

A gas turbine engine that has improved fuel burn provides operability and/or maintenance requirements when installed on an aircraft. The gas turbine engine is provided with a core compressor that includes twelve, thirteen or fourteen rotor stages. The gas turbine engine has a ratio of a core compressor aspect ratio divided by a core compressor pressure ratio is in the range of from 0.03 to 0.09. This results in an optimum balance between installation benefits, operability, maintenance requirements and engine efficiency when the gas turbine engine is installed on an aircraft.

22 Claims, 4 Drawing Sheets

Related U.S. Application Data continuation of application No. 16/437,356, filed on Jun. 11, 2019, now Pat. No. 10,550,700.

(51) Int. Cl.

| | |
|---|---|
| *F02C 3/02* | (2006.01) |
| *F02C 7/36* | (2006.01) |
| *F04D 29/68* | (2006.01) |
| *F04D 19/02* | (2006.01) |
| *F01D 5/28* | (2006.01) |
| *F02C 3/04* | (2006.01) |
| *F02C 3/107* | (2006.01) |
| *F02K 3/06* | (2006.01) |
| *F02K 3/068* | (2006.01) |

(52) U.S. Cl.
CPC ............... *F02C 3/04* (2013.01); *F02C 3/107* (2013.01); *F02C 7/04* (2013.01); *F02C 7/36* (2013.01); *F02K 3/06* (2013.01); *F02K 3/068* (2013.01); *F04D 19/024* (2013.01); *F04D 29/681* (2013.01)

(56) References Cited

U.S. PATENT DOCUMENTS

| | | |
|---|---|---|
| 11,085,399 B2 | 8/2021 | Phelps et al. |
| 11,149,690 B2 | 10/2021 | Phelps et al. |
| 2011/0211967 A1 | 9/2011 | Deal et al. |
| 2013/0149113 A1 | 6/2013 | Kohlenberg et al. |
| 2013/0186058 A1 | 7/2013 | Sheridan et al. |
| 2013/0195645 A1 | 8/2013 | Suciu et al. |
| 2013/0239586 A1 | 9/2013 | Parkin et al. |
| 2014/0283500 A1 | 9/2014 | Sabnis |
| 2015/0027101 A1 | 1/2015 | Hasel |
| 2015/0143794 A1 | 5/2015 | Schwarz et al. |
| 2015/0300264 A1 | 10/2015 | Schwarz |
| 2016/0003145 A1 | 1/2016 | Qiu et al. |
| 2016/0047304 A1 | 2/2016 | Schwarz et al. |
| 2016/0076460 A1 | 3/2016 | Schwarz et al. |
| 2016/0108854 A1 | 4/2016 | Lord et al. |
| 2016/0376981 A1 | 12/2016 | Ullyott et al. |
| 2018/0073518 A1 | 3/2018 | Wilkin, II et al. |
| 2018/0252166 A1 | 9/2018 | Pointon et al. |
| 2018/0283282 A1 | 10/2018 | Pointon et al. |
| 2018/0328288 A1 | 11/2018 | Lemarchand et al. |
| 2018/0340469 A1 | 11/2018 | Stuart et al. |
| 2019/0063368 A1 | 2/2019 | Phelps et al. |
| 2019/0063369 A1 | 2/2019 | Phelps et al. |
| 2019/0063370 A1 | 2/2019 | Phelps et al. |
| 2019/0128181 A1 | 5/2019 | Smith |
| 2019/0309688 A1 | 10/2019 | Stretton et al. |
| 2020/0102885 A1 | 4/2020 | Kupratis et al. |
| 2020/0290743 A1 | 9/2020 | Armstrong et al. |
| 2020/0291785 A1 | 9/2020 | Howarth et al. |

OTHER PUBLICATIONS

Lord, Wesley K., et al., "Ultra-Short Nacelles for Low Fan Pressure Ratio Propulsors", Proceedings of ASME Turbo Expo 2014: Turbine Technical Conference and Exposition, GT2014-26369, Jun. 16-20, 2014.

Waters, Mark H., et al., "Analysis of Turbofan Propulsion System Weight and Dimensions", NASA Technical Memorandum, NASA TM X-73,199, Jan. 1977.

Philip R. Gliebe, Bangalore A. Janardan, Ultra-High Bypass Engine Aeroacoustic Study, Oct. 2003, NASA CR-2003-212525, pp. 40-59 (Year: 2003).

D. E. Gray et al., "Energy Efficient Engine Preliminary Design and Integration Studies". NASA CR-135396, <http://ntrs.nasa.gov/archive/nasa/casi.ntrs.nasa.gov/19790003913.pdf> (Nov. 1978).

D. E. Gray et al., "Energy Efficient Engine Program". NASA CR-174766, <https://ntrs.nasa.gov/search.jsp?R=19900019249> (Oct. 1983).

Andreas Peters et al. "Ultra-Short Nacelles for Low Fan Pressure Ratio Propulsors". Proceedings of ASME Turbo Expo 2014, No. GT2014-26369, Jun. 16, 2014.

EFFICIENT GAS TURBINE ENGINE INSTALLATION AND OPERATION

CROSS-REFERENCE TO RELATED APPLICATION(S)

This application is a continuation of U.S. application Ser. No. 16/713,666 filed Dec. 13, 2019, which is a continuation of U.S. application Ser. No. 16/437,356 filed Jun. 11, 2019, which is based on and claims priority under 35 U.S.C. 119 from British Patent Application No. 1903262.2 filed on Mar. 11, 2019. The entire contents of the above applications are incorporated herein by reference.

The present disclosure relates to a gas turbine engine. Aspects of the present disclosure relate to a gas turbine engine having a configuration optimized for improved efficiency, installation and/or operability.

Modern gas turbine engines comprise a fan that is driven by a turbine. At least a part of the fan flow bypasses the core of the engine, and instead flows through a bypass duct to produce thrust. The flow that does pass into the core of the gas turbine engine is compressed in a compressor before being combusted, and then expanded through a turbine.

Optimizing the design of such gas turbine engines requires a number of different, often competing, factors to be balanced. For example, it is desirable to be able to optimize the overall efficiency of the gas turbine engine installation with an aircraft, but there are a number of different elements that combine to produce the overall efficiency. It would be desirable to provide a gas turbine engine that provides improved overall efficiency when installed with an airframe. Furthermore, it has been recognised that the pursuit of improved efficiency must not come at the expense of other factors, such as engine operability and maintenance requirements.

According to an aspect, there is provided a gas turbine engine for an aircraft comprising:
an engine core comprising a turbine, a compressor, and a combustor;
a fan (which may be located upstream of the engine core) comprising a plurality of fan blades; and
a gearbox that receives an input from a core shaft that is connected to at least a part of the turbine, the gearbox outputting drive to the fan so as to drive the fan at a lower rotational speed than the core shaft, wherein:
a bypass duct is defined radially outside the core, with the leading edge of a splitter defining the point at which flow splits into core flow and bypass flow in use;
a core compressor aspect ratio is defined as the ratio of the axial distance between the leading edge of the splitter and the leading edge of the tip of the most downstream compressor blade to the radius of the leading edge of the splitter;
a core compressor pressure ratio, defined as the pressure immediately downstream of the final rotor blade in the compressor divided by the pressure immediately upstream of the first rotor blade in the core compressor at cruise conditions, is in the range of from 34 to 60;
the core compressor comprises twelve, thirteen or fourteen rotor stages; and
the ratio of the core compressor aspect ratio divided by the core compressor pressure ratio is in the range of from 0.03 to 0.09.

It has been found that providing a gas turbine engine as claimed herein results in an engine that has a sufficiently high core compressor pressure ratio to achieve high thermal efficiency without requiring an excessively long compressor for a given radius of the leading edge of the splitter (which may itself be set by other design considerations, including, for example, the outer diameter of the gearbox). This may be enabled at least in part by achieving the core compressor pressure ratio using twelve, thirteen or fourteen rotor stages in the core compressor (i.e. excluding the fan). Fewer than twelve stages has been found to result in poor compression efficiency, whereas greater than fourteen stages has been found to result in an excessively long compressor. Optionally, the core compressor pressure ratio is achieved using exactly twelve (i.e. twelve and no more than twelve) rotor stages in the core compressor.

Achieving a core compression ratio over a relatively short compressor provides installation benefits when mounting the gas turbine engine to an aircraft—for example in terms of its interaction with other aircraft structures, such as the wing, leading to reduced overall aircraft fuel burn and/or the ability to install the engine without compromising other aircraft structures.

Still further, it has been found that geared gas turbine engines in particular tend to suffer from "rotor bow". This results from differential cooling (in the vertical plane) of one or more core shafts of the engine that connect the compressor to the turbine when the engine is shut down after use. This differential cooling—which is caused simply by the tendency for the warm air to rise towards the upper side of the shaft—results in the core shaft bending (or "bowing") as it cools. If remedial (and potentially costly and time-consuming) measures are not taken, this can result in the core shaft becoming locked in position for an extended period of time until it is fully cooled, during which period of time it is not possible to start the engine, and thus the aircraft to which it is attached is grounded. It has been found that providing a gas turbine engine having a ratio of the core compressor aspect ratio divided by the core compressor pressure ratio—as enabled by the claimed number of core compressor rotor stages—in the ranges defined and/or claimed herein provides a high thermal efficiency but with a greatly reduced risk of rotor bow. If the ratio of the core compressor aspect ratio divided by the core compressor pressure ratio is reduced still further below the lower bound disclosed and/or claimed herein (and/or the number of compression stages is reduced below twelve), it has been found that either the compression efficiency drops dramatically due to the requirement of providing a relatively high compression ratio over a distance that is too short, or the engine become particularly sensitive to rotor bow if the axial distance is increased in order to improve compression efficiency.

Optionally, the ratio of the core compressor aspect ratio divided by the core compressor pressure ratio is in the range having a lower bound of any one of 0.04, 0.045 or 0.05 and an upper bound of any one of 0.06, 0.07, 0.08 or 0.085.

The core compressor aspect ratio (CCAR) may be, for example, in the range having a lower bound of any of 1.7, 1.8, 1.9, 2, 2.1, 2.2 or 2.3 and an upper bound of any one of 4.2, 4, 3.8, 3.6, 3.4, 3.2, 3, 2.9 or 2.8, for example in the range of from 1.7 to 4.2; 1.8 to 3.4; 2.0 to 2.9; 2.1 to 2.9; or 2.3 to 2.8.

Each rotor stage may be axially separated from its neighbouring rotor stages. A stator stage may be provided between each pair of neighbouring rotor stages.

According to a second aspect there is provided a gas turbine engine for an aircraft comprising:
an engine core comprising a turbine, a compressor, and a combustor;
a fan (which may be located upstream of the engine core) comprising a plurality of fan blades; and a gearbox that receives an input from a core shaft that is connected to at least a part of the turbine, the gearbox outputting drive to the fan so as to drive the fan at a lower rotational speed than the core shaft, wherein:
a compression system radius ratio defined as the ratio of the radius of the tip of a fan blade to the radius of the tip of the most downstream compressor blade is in the range of from 5 to 9.

The most downstream compressor blade (which would typically be any one of a plurality of blades in a row) may be in the axially most downstream compressor blade row and/or a compressor blade in the blade row that is closest to the combustor and/or immediately upstream of the combustor (that is, without any in-between blade rows) and/or in the highest pressure compressor blade row.

The radius of the tip of the fan blade may be defined as the radius at the tip on the leading edge of the blade. Similarly, the radius of the tip of the most downstream compressor blade may be defined as the radius at the tip on the leading edge of the blade.

In some arrangements, the compression system radius ratio (CSRR) may be in a range having a lower bound of any one of 5, 5.1, 5.2, 5.3, 5.4, 5.5, 5.6, 5.7, 5.8, 5.9 or 6, and/or an upper bound of any one of 9, 8.9, 8.8, 8.7, 8.6, 8.5, 8.4, 8.3, 8.2, 8.1, 8, 7.9, 7.8, 7.7, 7.6, 7.5, 7.4, 7.3, 7.2, 7.1, 7, 6.9, 6.8, 6.7, 6.6 or 6.5. Purely by way of example, the CSRR may be in the range of from 5.2 to 8.5 or 5.3 to 7.2.

It has been found that gas turbine engines having arrangements in which the compression system radius ratio is in the ranges defined herein may provide improved overall efficiency of the gas turbine engine when installed with an airframe. For example, the compression system radius ratio in the ranges defined herein may result in an optimized balance between high propulsive efficiency (which typically improves with, amongst other factors, a relatively high diameter fan), high thermal efficiency (which typically improves with, amongst other factors, increasing core pressure ratio) and improved installation qualities, including aerodynamic interaction with the airframe and improved flexibility in positioning of the core (and thus the whole engine) relative to the airframe. In this regard, a low radius of the tip of the most downstream compressor blade relative to the radius of the fan blade may result in such improved flexibility in positioning the core, for example allowing the centreline of the engine to be positioned vertically closer to the aircraft wing for a given fan diameter. In some cases this may increase the maximum fan diameter that it is possible to install on a given airframe, which may in turn provide a propulsive efficiency advantage.

On the other hand, it has been found that reducing the radius of the tip of the most downstream compressor blade relative to the radius of the fan blade further, such that the CSRR is above the ranges defined herein (for example above 9), may be detrimental to the overall engine characteristics. This may be due to an intolerable decrease in compression efficiency (for example due to a higher than optimal compression ratio over a given axial length) and/or the installation benefits becoming compromised, for example due to increased compressor length (and thus engine length) required in order to achieve acceptable compression efficiency.

Still further, it has been found that providing a gas turbine engine having a CSRR in the ranges defined herein may provide high thermal and propulsive efficiency but with a greatly reduced risk of rotor bow, as described elsewhere herein. If the CSRR is increased still further above the upper bound disclosed herein, it has been found that either the compression efficiency may drop due to the requirement of providing a high enough compression ratio to maintain acceptable thermal efficiency over a distance that is too short, or the engine (and shaft) length may increase (in order to maintain acceptable compression efficiency) and it may become more susceptible to rotor bow.

Accordingly, it has been found that a CSRR in the defined ranges may provide a gas turbine engine that has high operability/low maintenance requirements, together with high efficiency when installed with an airframe, for example in terms of overall fuel burn and/or installation capability.

The gearbox assists in enabling the gas turbine engine to achieve the disclosed compression system radius ratio.

The compression system radius ratio divided by an engine core radius ratio may be in the range of from 5.5 to 10, for example 6 to 8, for example in a range having a lower bound of any one of 5.5, 5.6, 5.7, 5.8, 5.9, 6, 6.1, 6.2, 6.3, 6.4, 6.5 and/or an upper bound of any one of 10, 9.5, 9, 8.5, 8, 7.9, 7.8, 7.7, 7.6, 7.5, 7.4, 7.3, 7.2, 7.1, or 7. In this regard, the engine core radius ratio (ECRR) is as defined elsewhere herein, i.e. the ratio of the radius of the tip of the most downstream turbine blade in the engine to the radius of the leading edge of the splitter. Such arrangements may, in some cases, further improve the overall efficiency and/or installation and/or maintenance requirements of the gas turbine engine when installed with an airframe.

The compression system radius ratio divided by a core compressor aspect ratio may be in the range of from 1.7 to 4.2, for example in a range having a lower bound of any one of 1.7, 1.8, 1.9, 2, 2.1, 2.2, 2.3, 2.4, or 2.5 and/or an upper bound of any one of 4.2, 4.1, 4, 3.9, 3.8, 3.7, 3.6, 3.5, 3.4, 3.3, 3.2, 3.1, 3, 2.9, 2.8 or 2.7, for example in the range of from 1.8 to 2.9. In this regard, the core compressor aspect ratio (CCAR) is as defined elsewhere herein, i.e. as the ratio of the axial distance between the leading edge of the splitter and the leading edge of the tip of the most downstream compressor blade to the radius of the leading edge of the splitter. Such arrangements may, in some cases, further improve the overall efficiency and/or installation and/or maintenance requirements of the gas turbine engine when installed with an airframe. For example, such arrangements may have a particularly compact core compression system (for example in terms of axial length).

A compression system speed ratio may be as defined elsewhere herein, i.e. as the ratio of the rotational speed of the most downstream compressor blade to the rotational speed of the fan at cruise conditions. The product of the compression system radius ratio and the compression system speed ratio may be in the range of from 25 to 80, for example in a range having a lower bound of any one of 25, 30, 35, 40, 45 and/or an upper bound of any one of 80, 75, 70, 65, 60, 55 or 50. Such arrangements may, in some cases, further improve the overall efficiency and/or installation and/or maintenance requirements of the gas turbine engine when installed with an airframe.

Purely by way of example, of the radius of the tip of a fan blade may be in the range of from 120 cm to 140 cm and the radius of the tip of the most downstream compressor blade may be in the range of from 17 cm to 28 cm. Purely by way of further example, of the radius of the tip of a fan blade may be in the range of from 165 cm to 190 cm and the radius of the tip of the most downstream compressor blade may be in the range of from 24 cm to 35 cm.

According to a third aspect, there is provided a gas turbine engine for an aircraft comprising:
an engine core comprising a turbine, a compressor, and a combustor;

a fan comprising a plurality of fan blades, each fan blade having a fan blade height defined as the radius of the leading edge at the tip of the blade minus the radius of the point where the leading edge intersects the radially inner gas-washed hub; and a gearbox that receives an input from a core shaft that is connected to at least a part of the turbine, the gearbox outputting drive to the fan so as to drive the fan at a lower rotational speed than the core shaft, wherein:

the blade height of the most downstream compressor blade is defined as the radius of the leading edge at the tip of the blade minus the radius of the point where the leading edge intersects the radially inner gas-washed surface; and a compression system blade ratio (CSBR) defined as the ratio of the fan blade height to the height of the most downstream compressor blade is in the range of from 45 to 95.

The compression system blade ratio may be in a range having a lower bound of any one of 45, 46, 48, 50, 52, 54 or 56 and an upper bound of any one of 95, 90, 85, 80, 75 or 70.

It has been found that gas turbine engines having arrangements in which the compression system blade ratio is in the ranges defined herein may provide improved overall efficiency of the gas turbine engine when installed with an airframe. For example, the compression system blade ratio in the ranges defined herein may result in an optimized balance between high propulsive efficiency (which typically improves with, amongst other factors, a relatively large fan blade), high thermal efficiency (which typically improves with, amongst other factors, increasing core pressure ratio) and improved installation qualities, including aerodynamic interaction with the airframe and improved flexibility in positioning of the core (and thus the whole engine) relative to the airframe.

In particular, high propulsive efficiency may be achieved by having a high bypass ratio which may be enabled by a relatively large fan blade height. High thermal efficiency may be achieved by having a high compressor pressure ratio, which may be enabled by a relatively small height of the highest pressure compressor blade for a given fan blade height. Dropping the CSBR below the lower limit defined herein may reduce the overall engine efficiency due to the combined effects of the thermal efficiency and propulsive efficiency. However, if the CSBR is further increased beyond the upper limits defined herein, this may have an adverse impact on other engine characteristics. For example, it has been found that further increases in the CSBR may require the compression system to become unacceptably long in order to achieve acceptable levels of compression efficiency. This may lead to adverse impacts at an aircraft level, for example in terms of the engine's interaction with other aircraft structures, such as the wing, leading to reduced overall fuel burn and/or the ability to install the engine without compromising other aircraft structures.

Still further, it has been found that providing a gas turbine engine having a CSBR in the ranges defined herein may provide high thermal and propulsive efficiency but with a greatly reduced risk of rotor bow (which is described elsewhere herein). If the CSBR is increased still further above the upper bound defined herein, it has been found that either the compression efficiency may drop due to the requirement of providing a high enough compression ratio to maintain acceptable thermal efficiency over a distance that is too short, or the engine (and shaft) length may increase (in order to maintain acceptable compression efficiency), resulting in an increased susceptibility to rotor bow.

The gearbox assists in enabling the gas turbine engine to achieve the disclosed CSBR.

The compression system blade ratio divided by an engine core radius ratio may be in the range of from 50 to 95, for example in a range having a lower bound of 45, 50 or 52 and an upper bound of 65, 70, 75, 80, 85, 90 or 95, optionally 50 to 85 or 50 to 75. In this regard, the engine core radius ratio (ECRR) is as defined elsewhere herein, i.e. the ratio of the radius of the tip of the most downstream turbine blade in the engine to the radius of the leading edge of the splitter. Such arrangements may, in some cases, further improve the overall efficiency and/or installation and/or maintenance requirements of the gas turbine engine when installed with an airframe.

The compression system blade ratio divided by a core compressor aspect ratio may be in the range of from 15 to 50, for example in a range having a lower bound of 15, 16, 17, 18, 19 or 20 and an upper bound of 50, 45, 40, 35 or 30, optionally 16 to 40. In this regard, the core compressor aspect ratio (CCAR) is as defined elsewhere herein, i.e. as the ratio of the axial distance between the leading edge of the splitter and the leading edge of the tip of the most downstream compressor blade to the radius of the leading edge of the splitter. Such arrangements may, in some cases, further improve the overall efficiency and/or installation and/or maintenance requirements of the gas turbine engine when installed with an airframe. For example, such arrangements may have a particularly compact core compression system (for example in terms of axial length).

A compression system speed ratio may be as defined elsewhere herein, i.e. as the ratio of the rotational speed of the most downstream compressor blade to the rotational speed of the fan at cruise conditions. The product of the compression system blade ratio and the compression system speed ratio may be in the range of from 300 to 800, optionally 320 to 750, optionally 325 to 700. Such arrangements may, in some cases, further improve the overall efficiency and/or installation and/or maintenance requirements of the gas turbine engine when installed with an airframe.

According to a fourth aspect, there is provided a gas turbine engine for an aircraft comprising:

an engine core comprising a turbine, a compressor, and a combustor; and a fan comprising a plurality of fan blades, wherein:

a compression system speed ratio, defined as the ratio of the rotational speed of the most downstream compressor blade to the rotational speed of the fan at cruise conditions, is in the range of from 6 to 10, for example in a range having a lower bound of any one of 6, 6.1, 6.2, 6.3, 6.4, 6.5, 6.6, 6.7, 6.8, 6.9, 7, 7.1, 7.2, 7.3, 7.4, 7.5 and/or an upper bound of any one of 10, 9.5, 9, 8.9, 8.8, 8.7, 8.6, 8.5, 8.4, 8.3, 8.2, 8.1 or 8. By way of example, the compression system speed ratio may be in the range of from 7 to 9, for example 7.4 to 8.5, with the diameter of the fan optionally being in the range of from 320 to 390 cm and/or the rotational speed of the fan at cruise conditions being in the range of from 1300 rpm to 1800 rpm. In such an arrangement, the diameter of the fan may be in the range of from 230 cm to 400 cm. In such an arrangement, the turbine may comprise a first turbine and a second turbine; the compressor may comprise a first compressor and a second compressor. The first turbine and first compressor may be connected by a first core shaft, and the second turbine and second compressor may be connected by a second core shaft core. The second turbine, second compressor, and second core shaft may be arranged to rotate at a higher rotational speed than the first core shaft.

In such an arrangement, the most downstream compressor blade would part of the second compressor.

Such a gas turbine engine according to the fourth aspect may comprise a gearbox that receives an input from a core shaft that is connected to at least a part of the turbine, the gearbox outputting drive to the fan so as to drive the fan at a lower rotational speed than the core shaft.

It will be appreciated that compatible features from any aspect may be combined. Purely by way of example, a gas turbine engine according to an aspect may comprise any one or more of the ranges disclosed herein for: CSRR; CCAR; ECRR; CSSR; CSBR; core compressor pressure ratio; CCAR/(core compressor pressure ratio); CSRR/ECRR; CSRR/CCAR; CSRR*CSSR; CSBR/ECRR; CSBR/CCAR; CSBR*CSSR; number of compressor rotor stages.

Furthermore, the any one or more of the following features may apply to and/or be incorporated into any aspect of the present disclosure.

The first rotor blade in the core compressor may be referred to as the first rotor blade downstream of the fan. The final rotor blade in the compressor may be referred to as the highest pressure compressor blade, or the first rotor blade upstream of the combustor. Optionally, the core compressor pressure ratio (which is defined at cruise conditions) may be in the range having a lower bound of any one of 33, 34, 35, 36, 38 or 40 and an upper bound of any one of 52, 55, 57 or 60, for example 36 to 52 at cruise conditions. According to the definition provided herein, the core compressor pressure ratio does not include the pressure rise due to the fan.

A bypass duct is defined radially outside the core. The leading edge of a splitter defines the point at which flow splits into core flow and bypass flow (core flow being flow that goes through the core of the engine in use, and bypass flow being flow that goes into the bypass duct in use). An engine core radius ratio (ECRR) may then be defined as the ratio of the radius of the tip of the most downstream turbine blade in the engine to the radius of the leading edge of the splitter. The ECRR may be less than 1, for example in the range of from 0.75 to 1, 0.8 to 0.98, 0.81 to 0.94, or 0.82 to 0.93. Such arrangements may, in some cases, further improve the overall efficiency and/or installation and/or maintenance requirements of the gas turbine engine when installed with an airframe.

The fan blades may be surrounded by a nacelle, which may include a fan casing. Thus, the radially outer tips of the fan blades may be surrounded by a radially inner gas washed surface of the nacelle. Accordingly, the gas turbine engine may be referred to as a turbofan gas turbine engine and/or the fan may be referred to as a ducted fan. The nacelle may form a radially outer surface of the bypass duct of such a turbofan engine.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.25 to 0.32, or 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A gas turbine engine as described and/or claimed herein may further comprise an intake that extends upstream of the fan blades. An intake length L may be defined as the axial distance between the leading edge of the intake and the leading edge of the tip of the fan blades. The fan diameter D may be as defined elsewhere herein, i.e. the diameter of the fan at the leading edge of the tips of the fan blades. The ratio L/D may be less than 0.5, for example in the range of from 0.2 to 0.45, 0.25 to 0.4 or less than 0.4. Where the intake length varies around the circumference, the intake length L used to determine the ratio of the intake length to the diameter D of the fan may be measured at the $\pi/2$ or $3\pi/2$ positions from top dead centre of the engine (i.e. at the 3 o'clock or 9 o'clock positions), or the average of the intake length at these two positions where they are different.

Arrangements of the present disclosure may be particularly beneficial for fans that are driven via a gearbox. The gearbox receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

The gas turbine engine as described and/or claimed herein may have any suitable general architecture. For example, the gas turbine engine may have any desired number of shafts that connect turbines and compressors, for example one, two or three shafts. Purely by way of example, the engine core may comprise a first turbine, connected to a first compressor by a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor. In such an arrangement, the most downstream compressor blade would be a part of the second compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 45 to 70, or 50 to 65. Note that the overall pressure ratio differs from the core compressor pressure ratio because the overall pressure ratio also includes the pressure rise over the fan root (i.e. the portion of the fan over which air that subsequently flows into the engine core passes).

In some arrangements, a fan pressure ratio, defined as the ratio of the mean total pressure of the flow at the fan exit to the mean total pressure of the flow at the fan inlet, may be no greater than 1.5 at cruise conditions, for example no greater than 1.45, 1.4 or 1.35. The fan pressure ratio may be in the range of from 1.35 to 1.43, for example on the order of 1.39.

Downstream of the fan, the flow through the gas turbine engine is split into a core flow (which flows through the engine core) and a bypass flow (which flows through the bypass duct). The gas turbine engine comprises a splitter (which may be an annular splitter) at which the flow is divided between the core flow that flows through the engine core, and the bypass flow that flows along a bypass duct. In some arrangements, a fan root pressure ratio, defined as the ratio of the mean total pressure of the flow at the fan exit that subsequently flows through the engine core to the mean total pressure of the flow at the fan inlet, may be no greater than 1.3 at cruise conditions.

In some arrangements, the fan root pressure ratio at cruise conditions may be no greater than 1.24, for example no greater than 1.23, for example no greater than 1.22, for example no greater than 1.21, for example no greater than 1.2. In some arrangements, the fan root pressure ratio at cruise conditions may be in the range of from 1.18 to 1.30, for example 1.21 to 1.27.

Where the term mean is used herein in relation to a pressure (for example a total pressure), this may be (for example) an area average taken over the relevant surface.

A fan root to tip pressure ratio, defined as the ratio of the mean total pressure of the flow at the fan exit that subsequently flows through the engine core to the mean total pressure of the flow at the fan exit that subsequently flows through the bypass duct, may be no greater than (for example less than) 0.95, for example no greater than 0.94, 0.93, 0.92, 0.91 or 0.9 at cruise conditions, for example in the range of from 0.8 to 0.95, for example 0.82 to 0.89, for example 0.83 to 0.88.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$'s, 105 $Nkg^{-1}$'s, 100 $Nkg^{-1}$'s, 95 $Nkg^{-1}$'s, 90 $Nkg^{-1}$'s, 85 $Nkg^{-1}$'s or 80 $Nkg^{-1}$'s. The specific thrust may be in an inclusive range bounded by any two of the values in the previous sentence (i.e. the values may form upper or lower bounds), for example in the range of from 80 $Nkg^{-1}$'s to 100 $Nkg^{-1}$'s, or 85 $Nkg^{-1}$'s to 95 $Nkg^{-1}$'s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein. Such an aircraft may comprise, for example, 2, 3 or 4 such gas turbine engines. At least one engine (for example 1, 2 or more than 2 engines) may be attached to each wing of such an aircraft. As mentioned elsewhere herein, the installed engines may contribute significantly to overall aircraft efficiency, for example due to an improved combination of gas turbine engine efficiency together with advantages provided by improved installation with the airframe. Further operability and/or maintenance advantages may also be achieved, for example due to reduced susceptibility to rotor bow.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
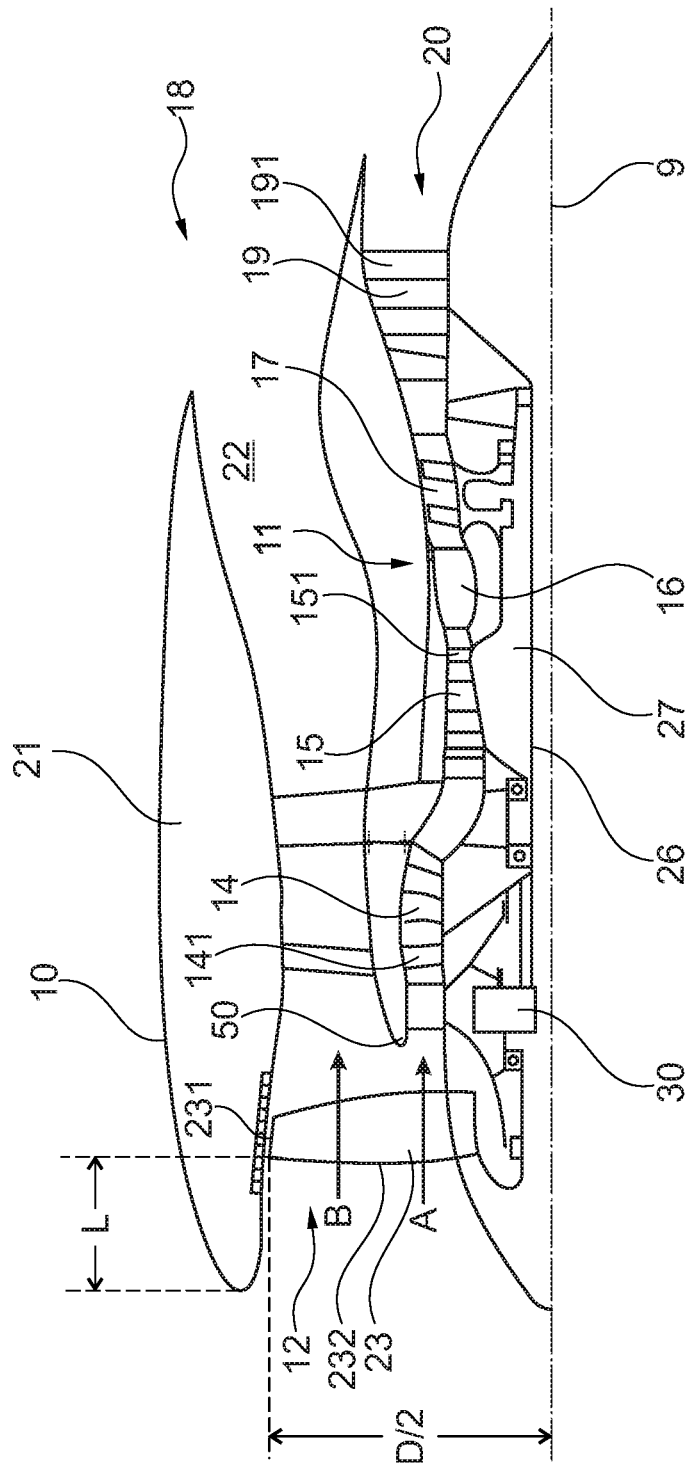
FIG. 1 is a sectional side view of a gas turbine engine in accordance with an example of the present disclosure.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Gas turbine engines are susceptible to a phenomenon known as "rotor bow". As described elsewhere herein, this results from differential cooling of one or more of the shafts 26, 27 when the engine is shut down after use, and can result in the engine being inoperative for an extended period of time after shut down, at least in the absence of time-consuming and/or expensive remedial action. It has been found that this problem may be exacerbated on modern engines, particularly those with a gearbox and/or high compression ratio. As explained elsewhere herein, the gas turbine engines 10 described and/or claimed herein may have a high efficiency (for example in terms of propulsive and/or thermal efficiency) but with a greatly reduced risk of rotor bow affecting the shafts 26, 27.

Figure 2:
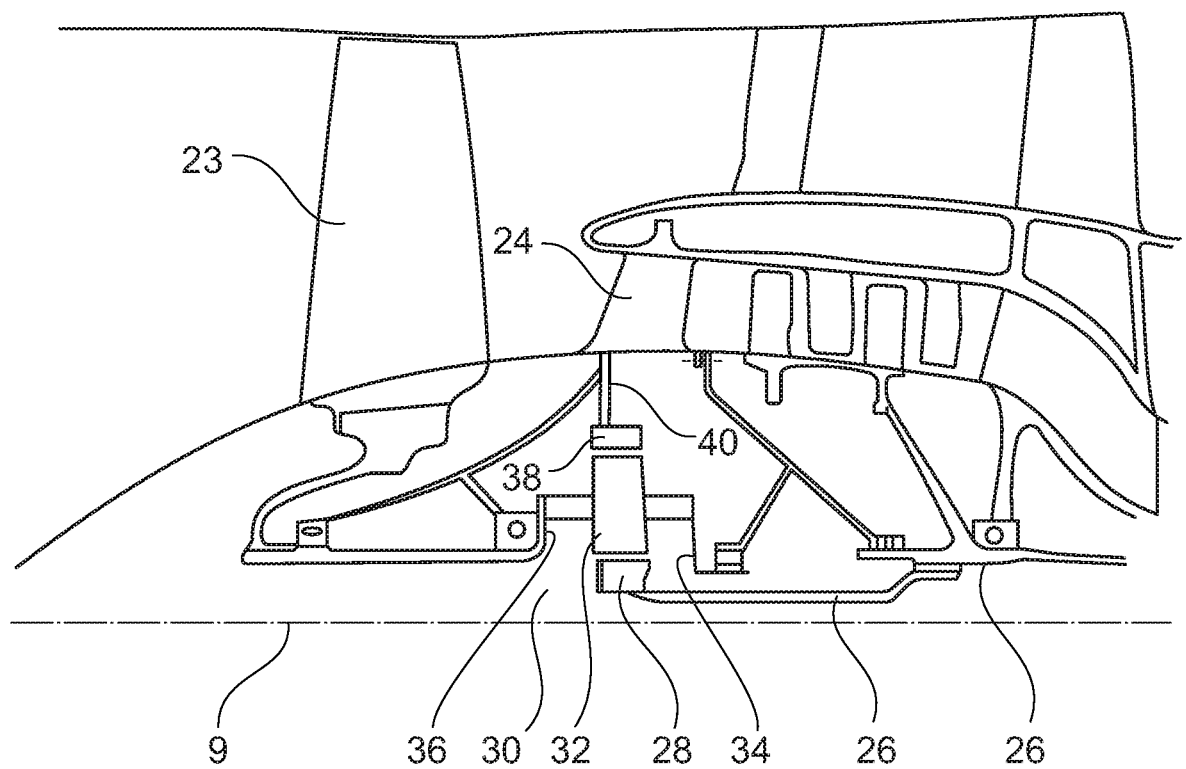
FIG. 2 is a close up sectional side view of an upstream portion of a gas turbine engine in accordance with an example of the present disclosure.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
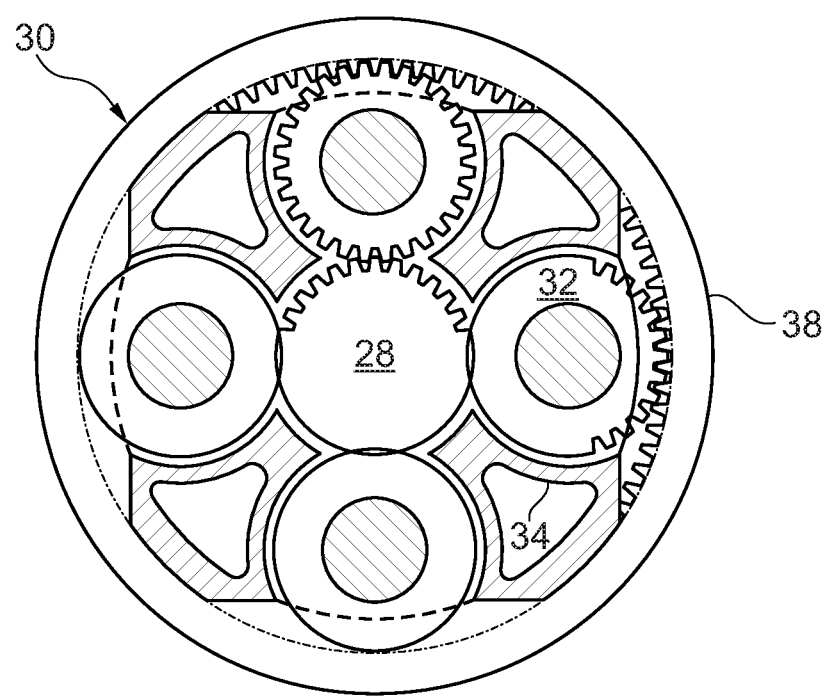
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
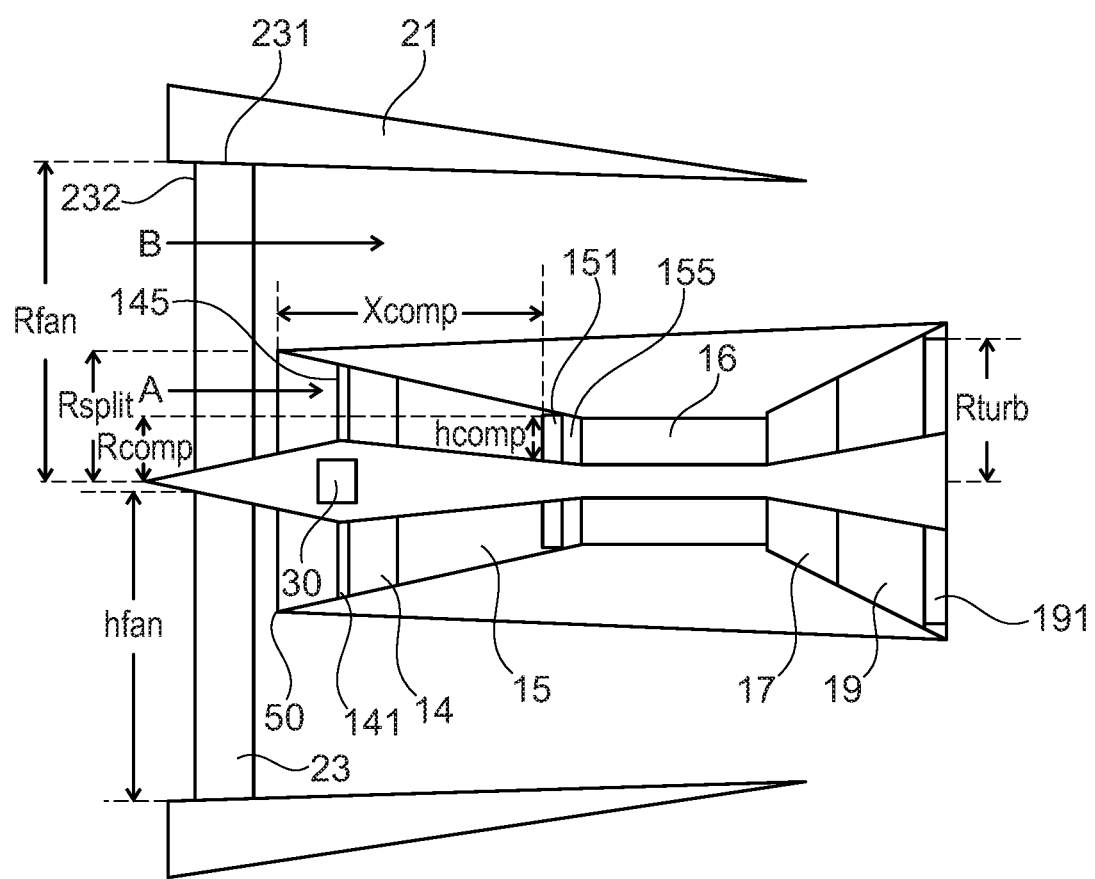
FIG. 4 is a schematic of a gas turbine engine in accordance with an example of the present disclosure.

It will be appreciated that FIG. 1 is not necessarily to scale in all aspects, and is included merely to aid the description. FIG. 4 is a schematic representation of a gas turbine engine according to the present disclosure, and is provided to illustrate the dimensions referred to herein. Again, FIG. 4 is not necessarily to scale in all aspects. Like reference numerals in the Figures represent like features, and the description provided in relation to one Figure may apply to like features in another Figure.

Referring to FIG. 4, the radius of the fan blade 23 (also referred to as the radius of the tip 231 of the fan blade) is indicated by the dimension 'Rfan'. The radius of the tip of the most downstream compressor blade 151 is indicated by the dimension 'Rcomp'. The compression system radius ratio CSRR is thus defined as:

$$CSRR = R\text{fan}/R\text{comp}$$

For the gas turbine engine 10, the value of CSRR may be in the ranges defined herein, for example in the range of from 5 to 9, optionally around 5.2 to 8.5, optionally around 5.3 to 7.2, optionally around 5.3 to 6.5.

The gas turbine engine 10 shown in FIG. 4 comprises a splitter 50 having a leading edge at which the flow splits between the bypass flow B and the core flow A.

The radius of the leading edge of the splitter is indicated by the dimension 'Rsplit'. The most downstream turbine blade 191 has a radius indicated by the dimension 'Rturb'. An engine core radius ratio ECRR is defined as:

ECRR=$R$turb/$R$split

For the gas turbine engine 10, the compression system radius ratio (CSRR) divided by the engine core radius ratio (ECRR) may be in the ranges defined herein, for example in the range of from 5.5 to 10, optionally 6 to 8. For the gas turbine engine 10, the compression system blade ratio (defined elsewhere herein) divided by the engine core radius ratio may be in the ranges defined herein, for example in the range of from 50 to 95, optionally 50 to 75. The ECRR itself may be, for example, in the range of from 0.75 to 1, for example 0.8 to 0.95.

The axial distance between the leading edge of the splitter 50 and the leading edge of the tip of the most downstream compressor blade 151 is indicated in FIG. 1 by the dimension 'Xcomp'. A core compressor aspect ratio CCAR is defined as:

CCAR=$X$comp/$R$split

For the gas turbine engine 10, the compression system radius ratio (CSRR) divided by the core compressor aspect ratio (CCAR) may be in the ranges defined herein, for example in the range of from 1.7 to 4.2, optionally 1.8 to 3.4. For the gas turbine engine 10, the compression system blade ratio (defined elsewhere herein) divided by a core compressor aspect ratio may be in the ranges defined herein, for example in the range of from 15 to 50 The CCAR itself may be in the range of from 2 to 3, for example 2.1 to 2.9, or 2.3 to 2.8.

A compression system speed ratio (CSSR) is defined as the ratio of the rotational speed of the most downstream compressor blade 151 to the rotational speed of the fan 23 at cruise conditions (the rotational speed of the most downstream compressor blade 151 being higher than the rotational speed of the fan 23, of course). For the gas turbine engine 10, the product of the compression system radius ratio and the compression system speed ratio may be in the range of from 25 to 80, for example in the range of from 35 to 65. For the gas turbine engine 10, the product of the compression system blade ratio and the compression system speed ratio may be in the range of from 300 to 800, optionally 320 to 750, optionally 325 to 700. The CSSR itself may be in the range of from 6.0 to 9.5, for example 6.5 to 9.0.

The fan blade has a height hfan. As indicated in FIG. 4 this is defined as the radius of the leading edge 232 at the tip 231 of the blade 23 minus the radius of the point where the leading edge 232 intersects the radially inner gas-washed hub. Similarly, the blade height hcomp of the most downstream compressor blade 151 is defined as the radius of the leading edge at the tip of the blade minus the radius of the point where the leading edge intersects the radially inner gas-washed surface. A compression system blade ratio CSBR is defined as:

CSBR=$h$fan/$h$comp

For the gas turbine engine 10, the compression system blade ratio CSBR may be in the ranges defined herein, for example in the range of from 45 to 95, 50 to 75 or 55 to 70.

A core compressor pressure ratio (CCPR) is defined as the pressure (i.e. the mean total pressure) immediately downstream of the final rotor blade 151 in the compressor (for example at the plane perpendicular to the axial direction at the axial position indicated schematically by reference numeral 155 in FIG. 4) divided by the pressure (i.e. the mean total pressure) immediately upstream of the first rotor blade 141 in the core compressor (for example at the plane perpendicular to the axial direction at the axial position indicated schematically by reference numeral 145 in FIG. 4) at cruise conditions. In some arrangements, the core compressor pressure ratio (which is defined at cruise conditions) may be in the range of from 34 to 60, for example 35, 36, 38 or 40 to 55, for example 41 to 52 at cruise conditions.

A ratio of the core compressor aspect ratio divided by the core compressor pressure ratio (i.e. CCAR/CCPR) may be in the ranges defined herein, for example in a range of from 0.03 to 0.09, for example in the range having a lower bound of any of 0.04, 0.045 or 0.05, and an upper bound of any of 0.06, 0.07, 0.08 or 0.085.

No compressor rotor blades other than the most upstream row of rotor blades 141 of the low pressure compressor 14 and the most downstream row of compressor blades 151 of the high pressure compressor 15 are shown in FIG. 4. However, it will be appreciated that this is merely to assist in the explanations provided herein, and that the low pressure compressor 14 and the high pressure compressor 15 each comprise more than one rotor stage, each of which may have an associated stator stage. The total number of rotor stages in the low pressure compressor 14 and the high pressure compressor 15 combined may be, for example, twelve, thirteen, or fourteen.

In a first arrangement of gas turbine engine 10, any one or more of the following may apply:

the radius of the fan blade Rfan is 160 cm to 190 cm, the radius of the tip of the most downstream compressor blade 151 is 27 cm to 31 cm, and the CSRR in the range of from 5.3 to 7.7; by way of non-limitative example, the radius of the fan blade Rfan is 175 cm and the radius of the tip of the most downstream compressor blade 151 is 29 cm, giving a CSRR of 6.0 the radius of the most downstream turbine blade 191 is 65 cm to 80 cm, the radius of the leading edge of the splitter 50 is 70 cm to 90 cm, and the ECRR in the range of from 0.8 to 1; by way of non-limitative example, the radius of the most downstream turbine blade 191 is 75 cm and the radius of the leading edge of the splitter 50 is 80 cm, giving an ECRR of 0.93 the axial distance between the leading edge of the splitter 50 and the leading edge of the tip of the most downstream compressor blade 151 Xcomp is 180 cm to 225 cm, and the CCAR is in the range of from 1.7 to 3.4; by way of non-limitative example, the axial distance between the leading edge of the splitter 50 and the leading edge of the tip of the most downstream compressor blade 151 Xcomp is 195 cm, giving a CCAR of 2.4 the fan blade height is 115 cm to 150 cm, the height of the most downstream compressor blade is 1.9 cm to 2.3 cm, and the CSBR is 50 to 90; by way of non-limitative example, the fan blade height is 125 cm, and the height of the most downstream compressor blade is 2.1 cm, giving a CSBR of 60 at cruise conditions, the rotational speed of the fan 23 is 1300 rpm to 1800 rpm and the rotational speed of the most downstream compressor blade 151 is 11000 rpm to 12000 rpm, and the CSSR is in the range of from 6.5 to 9; by way of non-limitative example, at cruise conditions, the rotational speed of the fan 23 is 1650 rpm and the rotational speed of the most downstream compressor blade 151 is 12000 rpm, giving a CSSR of 7.3 at cruise conditions, the fan pressure ratio is 1.30 to 1.45, the fan root pressure ratio is 1.18 to 1.30, the fan tip pressure ratio is 1.30 to 1.45, and the core compressor pressure ratio is 35 to 55; by way of non-limitative example, at cruise conditions, the fan pressure ratio is 1.4, the fan root pressure ratio is 1.25, the fan tip pressure ratio is 1.42, and the core compressor pressure ratio is 44 at cruise conditions, the CCPR is 40 to 60, the ratio CCAR/CCPR is 0.03 to 0.08, and the number of compressor rotor stages is 12 to 14; by way of non-limitative example, at cruise conditions, the CCPR is 44, the ratio CCAR/CCPR is 0.055, and the number of compressor rotor stages is 12.

Purely by way of example, the non-limitative examples referred to in each of the bullets points above relating to a first arrangement may relate to the same engine.

In a second arrangement, any one or more of the following may apply:

the radius of the fan blade Rfan is 120 cm to 140 cm, the radius of the tip of the most downstream compressor blade 151 is 20 cm to 25 cm, and the CSRR is in the range of from 5.2 to 6.6; by way of non-limitative example, the radius of the fan blade Rfan is 130 cm and the radius of the tip of the most downstream compressor blade 151 is 23 cm, giving a CSRR of 5.7 the radius of the most downstream turbine blade 191 Rturb is 40 cm to 60 cm, the radius of the leading edge of the splitter 50 Rsplit is 50 cm to 70 cm, and the ECRR is in the range of from 0.75 to 1.0; by way of non-limitative example, the radius of the most downstream turbine blade 191 Rturb is 45 cm and the radius of the leading edge of the splitter 50 Rsplit is 56 cm, giving an ECRR of 0.80 the axial distance between the leading edge of the splitter 50 and the leading edge of the tip of the most downstream compressor blade 151 Xcomp is 150 cm to 190 cm, and the CCAR is in the range of from 2.2 to 3.8; by way of non-limitative example, the axial distance between the leading edge of the splitter 50 and the leading edge of the tip of the most downstream compressor blade 151 Xcomp is 159 cm, giving a CCAR of 2.8 the fan blade height is 75 cm to 100 cm, the height of the most downstream compressor blade is 1.5 cm to 2.0 cm, and the CSBR is 45 to 75; by way of non-limitative example, the fan blade height is 85 cm, and the height of the most downstream compressor blade is 1.7 cm, giving a CSBR of 50 at cruise conditions, the rotational speed of the fan 23 is 2200 rpm to 2700 rpm, the rotational speed of the most downstream compressor blade 151 is 14000 rpm to 17000 rpm, and the CSSR is in the range of from 6 to 8; by way of non-limitative example, at cruise conditions, the rotational speed of the fan 23 is 2500 rpm and the rotational speed of the most downstream compressor blade 151 is 16000 rpm, giving a CSSR of 6.4 at cruise conditions, the fan pressure ratio is 1.30 to 1.45, the fan root pressure ratio is 1.18 to 1.30, the fan tip pressure ratio is 1.30 to 1.45, and the core compressor pressure ratio is 35 to 55; by way of non-limitative example, at cruise conditions, the fan pressure ratio is 1.4, the fan root pressure ratio is 1.25, the fan tip pressure ratio is 1.42, and the core compressor pressure ratio is 35 at cruise conditions, the CCPR is 34 to 50, the ratio CCAR/CCPR is 0.05 to 0.09, and the number of compressor rotor stages is 12 to 14; by way of non-limitative example, at cruise conditions, the CCPR is 35, the ratio CCAR/CCPR is 0.08, and the number of compressor rotor stages is 12.

Purely by way of example, the non-limitative examples referred to in each of the bullets points above relating to a second arrangement may relate to the same engine.

A further example of a feature that may be better optimized for gas turbine engines 10 according to the present disclosure compared with conventional gas turbine engines is the intake region, for example the ratio between the intake length L and the fan diameter D. Referring to FIG. 1, the intake length L is defined as the axial distance between the leading edge of the intake and the leading edge 232 of the tip 231 of the fan blades, and the diameter D of the fan 23 is defined at the leading edge of the fan 23 (i.e. D=2×Rfan). Gas turbine engines 10 according to the present disclosure, such as that shown by way of example in FIG. 1, may have values of the ratio L/D as defined herein, for example less than or equal to 0.45, for example 0.2 to 0.45. This may lead to further advantages, such as installation and/or aerodynamic benefits.

The gas turbine engine 10 shown by way of example in the Figures may comprise any one or more of the features described and/or claimed herein. For example, where compatible, such a gas turbine engine 10 may have any one or more of the features or values described herein of: CSRR; CCAR; ECRR; CSSR; CSBR; core compressor pressure ratio; CCAR/(core compressor pressure ratio); CSRR/ECRR; CSRR/CCAR; CSRR*CSSR; CSBR/ECRR; CSBR/CCAR; CSBR*CSSR; number of compressor rotor stages; specific thrust; maximum thrust, turbine entry temperature; overall pressure ratio; bypass ratio; fan diameter; fan rotational speed; fan hub to tip ratio; fan pressure ratio; fan root pressure ratio; ratio between the fan root pressure ratio to the fan tip pressure ratio; fan tip loading; number of fan blades; construction of fan blades; and/or gear ratio.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a turbine comprising a plurality of turbine blades, a compressor comprising a plurality of compressor blades, and a combustor;
a fan comprising a plurality of fan blades; and
a gearbox that receives an input from a core shaft that is connected to at least a part of the turbine, the gearbox configured to drive the fan at a lower rotational speed than a rotational speed of the core shaft, wherein:
a bypass duct is defined radially outside the core, with a leading edge of a splitter defining a point at which flow splits into a core flow and a bypass flow during operation of the gas turbine engine;
a core compressor aspect ratio is defined as a ratio of an axial distance between the leading edge of the splitter and a leading edge of a tip of a downstream-most compressor blade to a radius of the leading edge of the splitter, the radius of the leading edge of the splitter being measured from a centerline axis of the gas turbine engine, the core compressor aspect ratio being in a range of from 1.7 to 3.4; and an engine core radius ratio is defined as a ratio of a radius of a tip of a most downstream turbine blade in the gas turbine engine to the radius of the leading edge of the splitter, the engine core radius ratio being in a range of from 0.8 and 0.98;

wherein a compression system radius ratio is defined as a ratio of a radius of a tip of a fan blade of the plurality of fan blades to a radius of the tip of the downstream-most compressor blade, the radius of the tip of the fan blade and the radius of the tip of the downstream-most compressor blade each being measured from the centerline axis of the gas turbine engine, wherein the compression system radius ratio divided by the core compressor aspect ratio is in a range of from 2.4-4.2.

2. The gas turbine engine according to claim 1, wherein the core compressor aspect ratio is in a range of from 1.7 to 3.2.

3. The gas turbine engine according to claim 1, wherein the core compressor aspect ratio is in a range of from 1.8 to 3.0.

4. The gas turbine engine according to claim 1, wherein the core compressor aspect ratio is in a range of from 1.9 to 2.9.

5. The gas turbine engine according to claim 1, wherein the core compressor aspect ratio is in a range of from 2.3 to 2.8.

6. The gas turbine engine according to claim 1, wherein the engine core radius ratio is in a range of from 0.8 to 0.95.

7. The gas turbine engine according to claim 1, wherein the engine core radius ratio is in a range of from 0.81 to 0.94.

8. The gas turbine engine according to claim 1, wherein the engine core radius ratio is in a range of from 0.82 to 0.93.

9. The gas turbine engine according to claim 1, wherein a core compressor pressure ratio, defined as a pressure immediately downstream of the downstream-most compressor blade divided by a pressure immediately upstream of a forward-most compressor blade in the compressor at cruise conditions, is in a range of from 33 to 60.

10. The gas turbine engine according to claim 9, wherein the ratio of the core compressor aspect ratio divided by the core compressor pressure ratio is in a range of from 0.03 to 0.09.

11. The gas turbine engine according to claim 9, wherein the ratio of the core compressor aspect ratio divided by the core compressor pressure ratio is in a range of from 0.04 to 0.08.

12. The gas turbine engine according to claim 1, wherein: the radius of the tip of the fan blade is in a range of from 120 cm to 210 cm; and/or the gearbox has a reduction ratio in a range of from 3.2 to 3.8, such that the rotational speed of the core shaft is in a range of from 3.2 to 3.8 times the rotational speed of the fan.

13. The gas turbine engine according to claim 9, wherein: the core compressor pressure ratio is in a range of from 36 to 55.

14. The gas turbine engine according to claim 1, wherein the compression system radius ratio is in a range of from 5 to 7.5.

15. The gas turbine engine according to claim 1, wherein a compression system speed ratio, defined as a ratio of a rotational speed of the downstream-most compressor blade to the rotational speed of the fan at cruise conditions, is in a range of from 6 to 9.

16. The gas turbine engine according to claim 1, wherein a fan pressure ratio, defined as a ratio of a mean total pressure of a flow at a fan exit to a mean total pressure of a flow at a fan inlet at cruise conditions, is in a range of from 1.35 to 1.43.

17. The gas turbine engine according to claim 1, wherein:
a fan root pressure ratio, defined as a ratio of a mean total pressure of a flow at a fan exit that subsequently flows through the engine core to a mean total pressure of a flow at a fan inlet at cruise conditions, is in a range of from 1.18 to 1.30.

18. The gas turbine engine according to claim 1, wherein each fan blade of the plurality of fan blades comprises a main body attached to a leading edge sheath, the main body and the leading edge sheath being formed using different materials.

19. The gas turbine engine according to claim 18, wherein the leading edge sheath material comprises titanium and/or the main body material comprises an aluminium alloy.

20. The gas turbine engine according to claim 1, further comprising an intake that extends upstream of the plurality of fan blades, wherein: an intake length L is defined as an axial distance between a leading edge of the intake and a leading edge of the tip of the fan blade; a fan diameter D is a diameter of the fan at the leading edge of the tip of the fan blade; and a ratio L/D is in a range of from 0.2 to 0.45.

21. The gas turbine engine according to claim 1, wherein:
the core shaft is a second core shaft;
the compressor is a compressor section comprising a first compressor and a second compressor; and
the turbine is a turbine section comprising a first turbine and a second turbine, wherein the engine core further comprises a first core shaft connecting the first turbine to the first compressor;
wherein the second core shaft connects the second turbine to the second compressor;
the second turbine, the second compressor, and the second core shaft are arranged to rotate at a higher rotational speed than a rotational speed of the first core shaft; and
a number of compressor rotor stages is split between the first compressor and the second compressor.

22. An aircraft comprising at least one gas turbine engine according to claim 1.

* * * * *